(12) United States Patent
Reilly et al.

(10) Patent No.: US 12,418,740 B2
(45) Date of Patent: Sep. 16, 2025

(54) LATENCY-BASED PRIMARY BUD ROLE SWAP

(71) Applicant: BOSE CORPORATION, Framingham, MA (US)

(72) Inventors: Dylan Maxwell Reilly, Ashland, MA (US); Michael William Elliot, North Grafton, MA (US)

(73) Assignee: Bose Corporation, Framingham, MA (US)

( * ) Notice: Subject to any disclaimer, the term of this patent is extended or adjusted under 35 U.S.C. 154(b) by 326 days.

(21) Appl. No.: 18/152,565

(22) Filed: Jan. 10, 2023

(65) Prior Publication Data

US 2024/0236542 A1 Jul. 11, 2024

(51) Int. Cl.
*H04R 1/10* (2006.01)
*H04B 17/309* (2015.01)

(52) U.S. Cl.
CPC ......... *H04R 1/1041* (2013.01); *H04B 17/309* (2015.01); *H04R 1/1016* (2013.01); *H04R 2420/07* (2013.01)

(58) Field of Classification Search
CPC ............... H04R 1/1041; H04R 1/1016; H04R 2420/07; H04B 17/309
USPC ............................ 381/74, 312, 75, 23.1, 370
See application file for complete search history.

(56) References Cited

U.S. PATENT DOCUMENTS

| | | |
|---|---|---|
| 11,451,897 B1 | 9/2022 | Chinnapalli et al. |
| 2017/0070919 A1 | 3/2017 | Verger et al. |
| 2019/0327778 A1* | 10/2019 | Morris .................. H04W 88/04 |

OTHER PUBLICATIONS

International Search Report and Written Opinion for International Application No. PCT/US2023/086180 Mailed Apr. 22, 2024.
Nexus Cisco, "Data Center 40GE Switch Study Cisco Nexus 9516 DR 140127E", Jan. 26, 2024, 20 pages.

* cited by examiner

*Primary Examiner* — Thjuan K Addy
(74) *Attorney, Agent, or Firm* — Patterson + Sheridan, LLP

(57) ABSTRACT

Audio drop outs may be reduced by incorporating audio latency variability metrics in handover decision making algorithms. In aspects, predictive audio latency variability metrics, in combination with signal quality measurements, are used to determine when to handover primary earbud responsibilities between earbuds of an earbud system.

19 Claims, 5 Drawing Sheets

LATENCY-BASED PRIMARY BUD ROLE SWAP

FIELD

Aspects of the present disclosure describe an earbud system. Each earbud of the system is capable of wirelessly communicating with the other earbud and selectively receiving a stream of audio data from a user device. The primary or master earbud of the earbud system requests specific audio data packets from the user device and transmits audio data to the secondary earbud of the earbud system. Aspects describe methods performed by an earbud system for handing over primary earbud responsibilities between earbuds of the system based, at least in part, on an audio latency variance of the audio stream.

BACKGROUND

Wireless earbuds advantageously eliminate the hassle of adjusting wires and removes tethering to a user device, thereby allowing users to enjoy wireless listening in a variety of situations. For example, wireless earbuds are suitable for voice calls, gaming, listening to music while exercising, and watching movies. They offer flexibility for active lifestyles with robust audio output. A user experience may be enhanced by avoiding unnecessary audio drop-outs, especially during on-the-go movement.

SUMMARY

Aspects provide methods and earbud systems performing methods of handing over primary earbud responsibilities based, at least in part, on audio latency variability.

In an aspect, an earbud system is provided. The earbud system comprises a first earbud (right earbud) and a second earbud (left earbud). The right earbud, when serving primary earbud responsibilities of the earbud system, wirelessly receives audio data from a user device, requests specific audio data packets from the user device, and is in wireless communication with the left earbud acting as a secondary earbud of the earbud system. The right earbud performs a procedure to hand over the primary earbud responsibilities to the left earbud based, at least in part, on an audio latency variance of the audio data.

In aspects, an audio latency of the audio data received by the right earbud is a proxy for volatility of buffered audio at the right earbud.

In aspects, the procedure comprises: determining an acceptable signal quality between the user device and the right earbud; determining an acceptable signal quality between the user device and the left earbud; assuming an audio latency variance of the audio data at the left earbud is acceptable based, at least, in part on the acceptable signal quality between the user device and the left earbud; computing, by the right earbud, the audio latency variance of the audio data received by the right earbud exceeds a threshold when the audio latency variance of the audio data at the left earbud is acceptable; and handing over the primary earbud responsibilities to the left earbud based on the computation such that the left earbud serves as the primary earbud and the right earbud serves as the secondary earbud.

In aspects, the procedure further comprises: computing, by the left earbud, the audio latency variance of the audio data received by the left earbud, serving as the primary earbud, from the user device is unacceptable; and handing over the primary earbud responsibilities to the right earbud based on the computed unacceptable audio latency variance of the audio data received by the left earbud.

In aspects, the signal quality comprises at least one of a link quality indicator (LQI) or a received signal strength indicator (RSSI).

In aspects, the earbud of the earbud system performing primary earbud responsibilities computes audio latency variance associated with the primary earbud based on the audio data received from the user device.

In aspects, the earbud of the earbud system acting as the secondary earbud infers audio latency variance associated with the secondary earbud based, at least in part, on a signal quality between the secondary earbud and the user device.

Aspects provide a method performed by an earbud system comprising: wirelessly receiving, at a right earbud when serving primary earbud responsibilities of the earbud system, audio data from a user device; and performing, by the earbud system, a procedure to hand over the primary earbud responsibilities to a left earbud of the earbud system based on an audio latency variance of the audio data received by the right earbud.

In aspects, performing the procedure comprises determining an acceptable signal quality between the user device and the right earbud; determining an acceptable signal quality between the user device and the left earbud; assuming an audio latency variance of the audio data at the left earbud is acceptable based, at least, in part on the acceptable signal quality between the user device and the left earbud; computing, by the right earbud, the audio latency variance of the audio data received by the right earbud exceeds a threshold when the audio latency variance of the audio data at the left earbud is acceptable; and handing over the primary earbud responsibilities to the left earbud based on the computation such that the left earbud serves as the primary earbud and the right earbud serves as a secondary earbud.

In aspects, the procedure further comprises: computing, by the left earbud, the audio latency variance of the audio data received by the left earbud, serving as the primary earbud, from the user device is unacceptable; and handing over the primary earbud responsibilities to the right earbud based on the computed unacceptable audio latency variance of the audio data received by the left earbud.

In aspects, the signal quality comprises at least one of a link quality indicator (LQI) or a received signal strength indicator (RSSI).

In aspects, determining the acceptable signal quality between the user device and the right earbud comprises determining an acceptable link quality indicator and an acceptable received signal strength indicator; and determining the acceptable signal quality between the user device and the left earbud comprises determining an acceptable link quality indicator and an acceptable received signal strength indicator.

In aspects, the method further comprises computing, by the earbud of the earbud system performing primary earbud responsibilities, audio latency variance associated with the primary earbud based on the audio data received from the user device.

In aspects, the method further comprises inferring, by the earbud of the earbud system acting as a secondary earbud, audio latency variance associated with the secondary earbud based, at least in part, on a signal quality between the secondary earbud and the user device. In aspects, performing the hand over is further based, at least in part, on a comparison between the computed audio latency variance and inferred audio latency variance.

In aspects, the method further comprises determining an acceptable signal quality between the user device and the right earbud and an acceptable signal quality between the user device and the left earbud. The hand over procedure is performed based the acceptable signal quality between the user device and the right earbud, the acceptable signal quality between the user device and the left earbud, and the audio latency variance of the audio data received by the right earbud.

Aspects provide a method performed by an earbud system comprising: wirelessly receiving, at a right earbud when serving primary earbud responsibilities of the earbud system, audio data from a user device; determining each of a link quality indicator (LQI) and received signal strength indicator (RSSI) of the audio data from the user device to the right earbud are acceptable; determining each of the LQI and RSSI of the audio data are acceptable at a left earbud of the earbud system; determining an audio latency variance of the audio data at the right earbud becomes unacceptable; and performing, by the earbud system, a procedure to hand over the primary earbud responsibilities to a left earbud of the earbud system based on the acceptable LQI and RSSI at the right earbud, the acceptable LQI and RSSI at the left earbud, and the audio latency variance of the audio data received by the right earbud becoming unacceptable.

In aspects, the method further comprises after the procedure, determining an audio latency variance of the audio data at the left earbud, serving primary earbud responsibilities, becomes unacceptable; determining a handover condition is satisfied; and performing, by the earbud system, the procedure to hand over primary earbud responsibilities to the right earbud based on the audio latency variance of the audio data at the left earbud becoming unacceptable and the handover condition being satisfied.

In aspects, the handover condition comprises the right earbud being the preferred handedness earbud of the earbud system.

In aspects, the handover condition comprises determining at least one of the LQI or RSSI at the right earbud has improved.

In aspects, the audio latency of the audio data received by the right earbud is a proxy for volatility of buffered audio at the right earbud.

All examples and features mentioned herein can be combined in any technically possible manner. Other features, objects, and advantages will become apparent from the following detailed description, when read in connection with the following drawings.

DETAILED DESCRIPTION

Wireless audio output devices have become a prevalent part and convenient aspect of daily life. True wireless audio output devices offer the benefits of audio devices with the added convenience of being completely free of any cables or connectors that link both of the earbuds together or to a user device.

Figure 1:
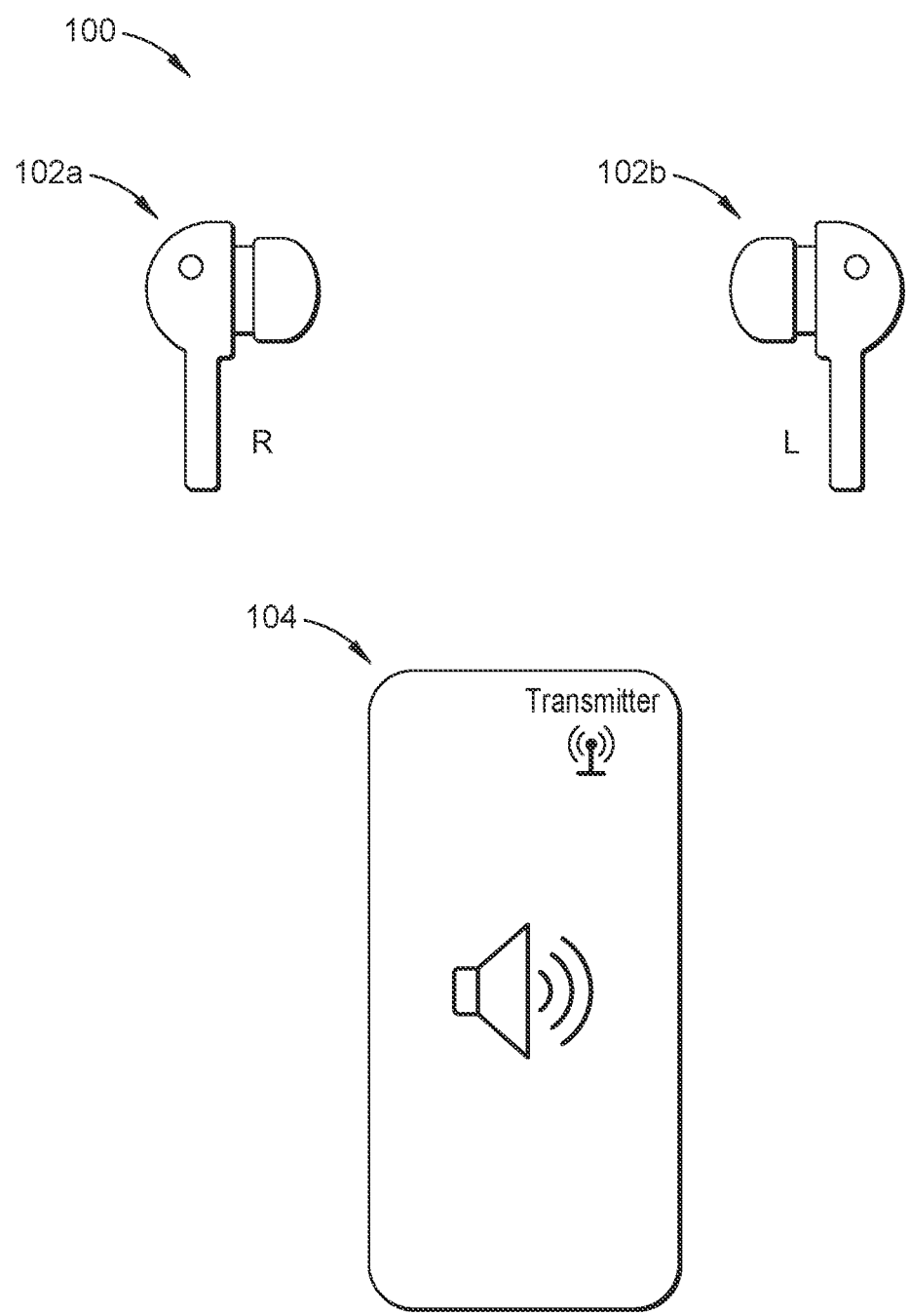
FIG. 1 illustrates an example system including an earbud system and a user device.

FIG. 1 shows an example system 100, in accordance with aspects of the present disclosure. The earbud system consists of two earbuds, a right earbud 102a (which may be called Bud A) and a left earbud 102b (which may be called Bud B). Both the right earbud 102a and the left earbud 102b are capable of wirelessly communicating with a user device 104 that streams audio data to the earbud system.

In an example scenario, the earbud system is a true wireless system. One of the earbuds, designated as the primary earbud (master or primary receiver), wirelessly receives audio data from a user device. The primary earbud is also in control of requesting specific packets of audio data from the user device. The other earbud becomes the secondary earbud (secondary receiver). The secondary earbud receives its audio data by sniffing traffic between the primary earbud and the user device and from the primary earbud.

As illustrated in FIG. 1, the right earbud 102a is the primary earbud, as it is in control of requesting packets from the user device 104. In an aspect, the primary earbud receives the audio data via a Bluetooth signal; however, any wireless protocol may be used. The secondary earbud, 102b receives its audio data by eavesdropping on the primary earbud's 102a connection with the user device 104 and requesting the primary earbud 102a to send the secondary earbud 102b any missing audio packets.

While not illustrated, each of the earbuds includes a transmitter, receiver, audio data buffer, wireless communication protocol stack (for example, Bluetooth stack) and circuitry configured to control the functionality of the earbuds. The user device may be any device that communicates with and streams audio data to the earbuds. The terms "right earbud" and "left earbud" are used for illustrative purposes only; it is assumed that the earbud system include two earbuds, which are referenced herein as right and left earbuds and each earbud may assume the primary earbud responsibilities.

As described above, the primary earbud assumes the responsibility for connecting with the user device. The primary earbud serves several responsibilities including acting as a bridge between the audio source user device and the secondary earbud, managing the audio connection between the two earbuds and, in aspects, compensating for audio delay that may occur between earbuds during transmission. Consequently, the selection of the primary earbud and handover of primary earbud responsibilities to the other earbud when appropriate is important to avoid unnecessary audio drop-outs. Therefore, improved methods for determining when to switch primary earbud responsibilities between earbuds of an earbud system are desirable.

Currently, handover decisions are based on the signal quality between the user device and each of the earbuds. Two indicators of signal quality of the audio signal are link quality indicator (LQI) and received signal strength indicator (RSSI). LQI is calculated by the underlying Bluetooth stack in each of the respective earbuds. Based on the Bluetooth Core Specification, each Bluetooth module provides a measurement of the link quality. The measurement is based on the signal strength and packet fragmentation measurements over time. RSSI is the measured received signal strength in dB of the signal to the connected earbud. Like LQI, each earbud measures its respective RSSI. In aspects, each earbud communicates its LQI and RSSI to the other earbud of the system.

Signal quality between the user device and the connected earbud system focuses on prevailing conditions and measurements of current happenings. In an effort to more accurately determine which earbud is better suited to serve as the primary earbud, aspects of the present disclosure determine handover based on a predictive factor associated with audio stability trends.

According to aspects of the present disclosure, a handover decision making algorithm implemented by the earbud system uses audio latency variance (LAT) to determine when to switch primary earbud responsibilities between earbuds of the system. LAT measures the volatility of the buffered audio at an earbud. When an audio buffer is depleted, the user will experience audio drop-outs. A high LAT may be indicative that the primary earbud is not receiving audio data fast enough, as the buffer is becoming full and empty as opposed to staying stable. The high LAT may result in audio drop-outs, therefore it is desirable to avoid a high LAT.

In a true wireless earbud system, as illustrated in FIG. 1, audio data is continually streamed from a user device. The primary earbud receives audio data from the user device and is in control of asking the user device for specific packets of audio data as needed. The secondary earbud receives its audio by eavesdropping on the primary earbud's connection to the user device and also requesting the primary earbud to transmit any missing packets. Audio latency is a measurement tied to the amount of streaming audio the earbud system has buffered. To ensure smooth playback with no drop-outs, this buffer cannot be empty. If the buffer is empty, playback will halt until more audio data is received from the user device. For example, it may be desirable to ensure that 150 milliseconds of audio is available in the buffer at any time. A 150 millisecond buffer of audio data means that system could fail to receive any new audio data from the user device for up to 150 milliseconds before interruption of playback would be necessary. Once the buffer is expended, the audio latency values change to reflect the time between incoming packets. The trend in volatility of the audio latency measurement is used as a predictor of a potential audio drop out event, and in turn a predictor of signal quality.

One way of learning the volatility of a data set is to compute the variance. In an aspect, a rolling population variance calculation is derived from "Welford's method" of analyzing the difference between two successive variance values. Additional filtering in the time domain (infinite impulse response (IIR) filter as with the other metrics) produces a sufficiently stable measurement. Under ideal conditions, the audio buffer is consistently full and the variance will be equal or very close to 0. Conditions that can lead to buffer starvation exhibit statistically higher variance values as the buffer fills, depletes, and fills repeatedly.

Certain earbud usage patterns result in the customary measurements of LQI and RSSI remaining acceptable and yet audio buffer depth becoming insufficient or unstable. In an example, the signal path from the user device to the earbud is not direct and audio packets have longer than expected flight times. In another example, there are few or no nearby surfaces off of which a signal can bounce (e.g., when a user is outside) and the "shortest path" signal path involves going through a user's body.

In yet another example, signal pathing is not consistent. When some signal paths are significantly "shorter" than others, audio packets can arrive out of order. The audio device then needs to discard and request a resend, which can lead to buffer starvation. An example of some signal paths being "shorter" than others is observed when a user is carrying the user device in their hand while running. The user's arm swing creates very different signal paths as it moves up close to their head (direct path) and down towards their hips (through-body path). Therefore, while traditional methods of using signal strength to determine when to handover primary bud responsibilities are helpful, aspects of the present disclosure use LAT to influence handover decisions. In aspects, and as described in more details below, LAT is used in conjunction with signal strength measurements to determine if a handover condition is met.

Figure 2:
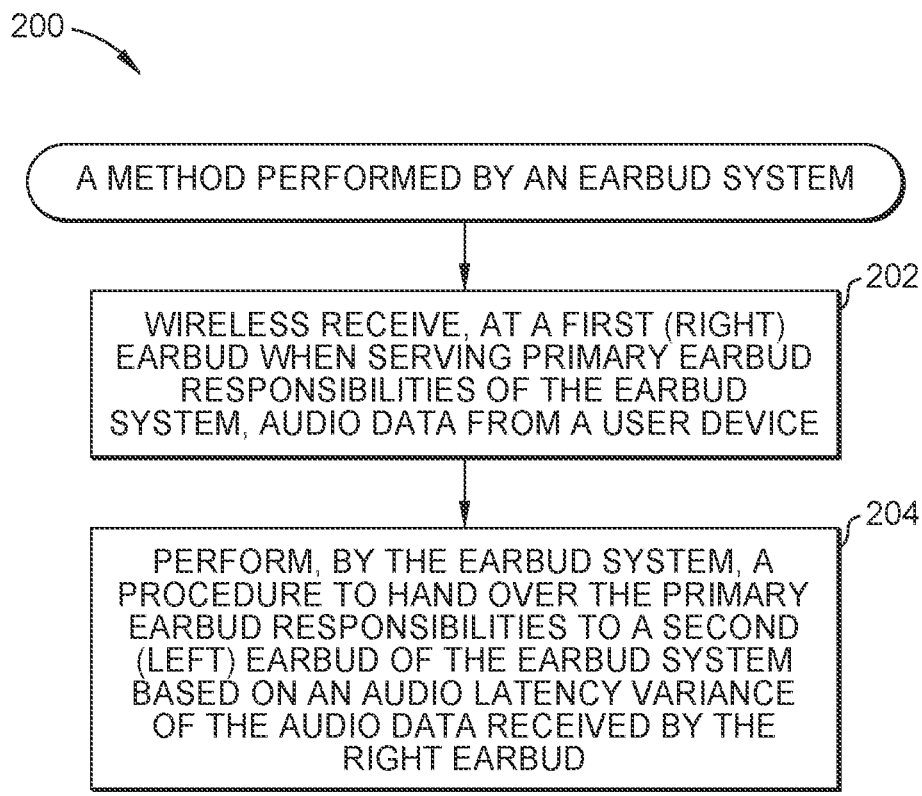
FIG. 2 illustrates an example method performed by an earbud system, in accordance with aspects of the present disclosure.

FIG. 2 illustrates an example method 200 performed by an earbud system, in accordance with aspects of the present disclosure. At 202, a first earbud (for example, right earbud), when serving primary earbud responsibilities of the earbud system, wirelessly receives audio data from a user device, requests specific audio data packets from the user device, and is in wireless communication with a second earbud (for example, left earbud) acting as a secondary earbud of the earbud system. The right earbud may be earbud 102a, the left earbud may be earbud 102b, and the user device may be 104 as illustrated in FIG. 1.

At 204, the right earbud performs a procedure to hand over the primary earbud responsibilities to the left earbud based, at least in part, on an LAT of the audio data. Audio latency variance provides insight into the audio stream stability trends and helps to predict a signal loss before it occurs.

In aspects, the signal quality measuring current conditions may be used in combination with the LAT focusing on predictive audio stability trends to determine handover. In an example, a signal quality score is generated based on LQI, RSSI, and LAT.

Figure 3:
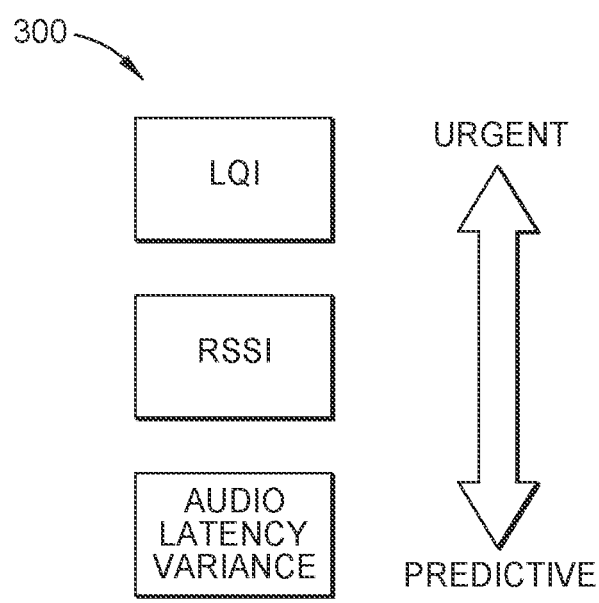
FIG. 3 illustrates a prioritization of the metrics used to determine if a handover condition is met.

FIG. 3 illustrates a prioritization 300 of the metrics used to determine if a handover condition is met. LQI and RSSI measure current signal quality. As such LQI and RSSI have a higher priority than a predictive indicator such as LAT. All three metrics taken together provide a balance of considering prevailing (immediate/urgent) and predictive conditions in an effort to more accurately determine when to handover primary earbud responsibilities.

Each of the three metrics starts as a numerical value; however only a pass/fail (acceptable/unacceptable) categorization is needed for purposes of making a handover decision. To transform each numerical value to a binary rating, each measurement undergoes a series of transformations.

Figure 4:
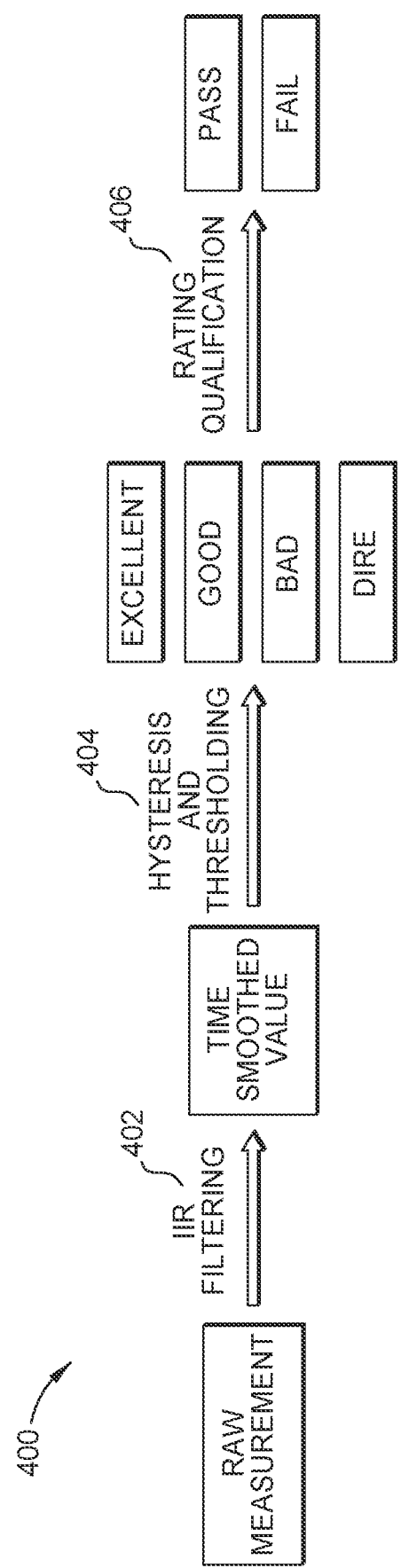
FIG. 4 illustrates an example transformation of each metric resulting in a "pass" or "fail" indication.

FIG. 4 illustrates an example transformation 400 of each metric resulting in a "pass" or "fail" indication. At 402, a raw measurement undergoes an IIR filter resulting in a time-smoothed value. At 404, the time-smoothed value undergoes hysteresis and thresholding such that the time-smoothed value is rated as one of excellent, good, bad, or dire. At 406, a rating qualification categorizes the rating as either pass (acceptable) or fail (unacceptable). In an example, excellent or good may be rated as pass (acceptable) and bad or dire may be categorized as fail (unacceptable). FIG. 4 illustrates a high-level transformation that may be applied to each metric. Each metric may have platform-specific filtering constants, hysteresis and thresholding based on data analysis and tuning.

In an example method, the scores associated with each of the metrics are arranged in descending order of prevalence/urgency as illustrated in FIG. 2. Metrics that are the most prevalent are given a higher weighting in the event that predictive metrics are unable to anticipate a correct future state. In an example, an unacceptable LQI at a current primary bud, and acceptable LQI at a secondary earbud, results in a handover without considering RSSI and LAT.

Similarly, when both the primary and secondary earbuds have an acceptable LQI, the primary has an unacceptable RSSI, and the secondary has an acceptable RSSI, the buds will swap roles, without considering the LAT.

In real (or near real time), both the primary and secondary earbuds can measure their respective LQI and RSSI. The primary earbud is capable of calculating (determining, producing) a consistent LAT measurement as it is in control of the stream of audio packets from the user device. Given the true wireless architecture, the secondary earbud eavesdrops on the connection between the primary earbud and user device. As such, the secondary earbud may not be able to measure LAT. A good or better LQI and RSSI typically implies a healthy audio buffer. Therefore, for the secondary earbud, the LAT rating is set to acceptable whenever the RSSI and LQI change to a good or excellent rating on the secondary earbud. The secondary earbud may assume an acceptable LAT when the LQI and RSSI are determined to be acceptable.

Figure 5:
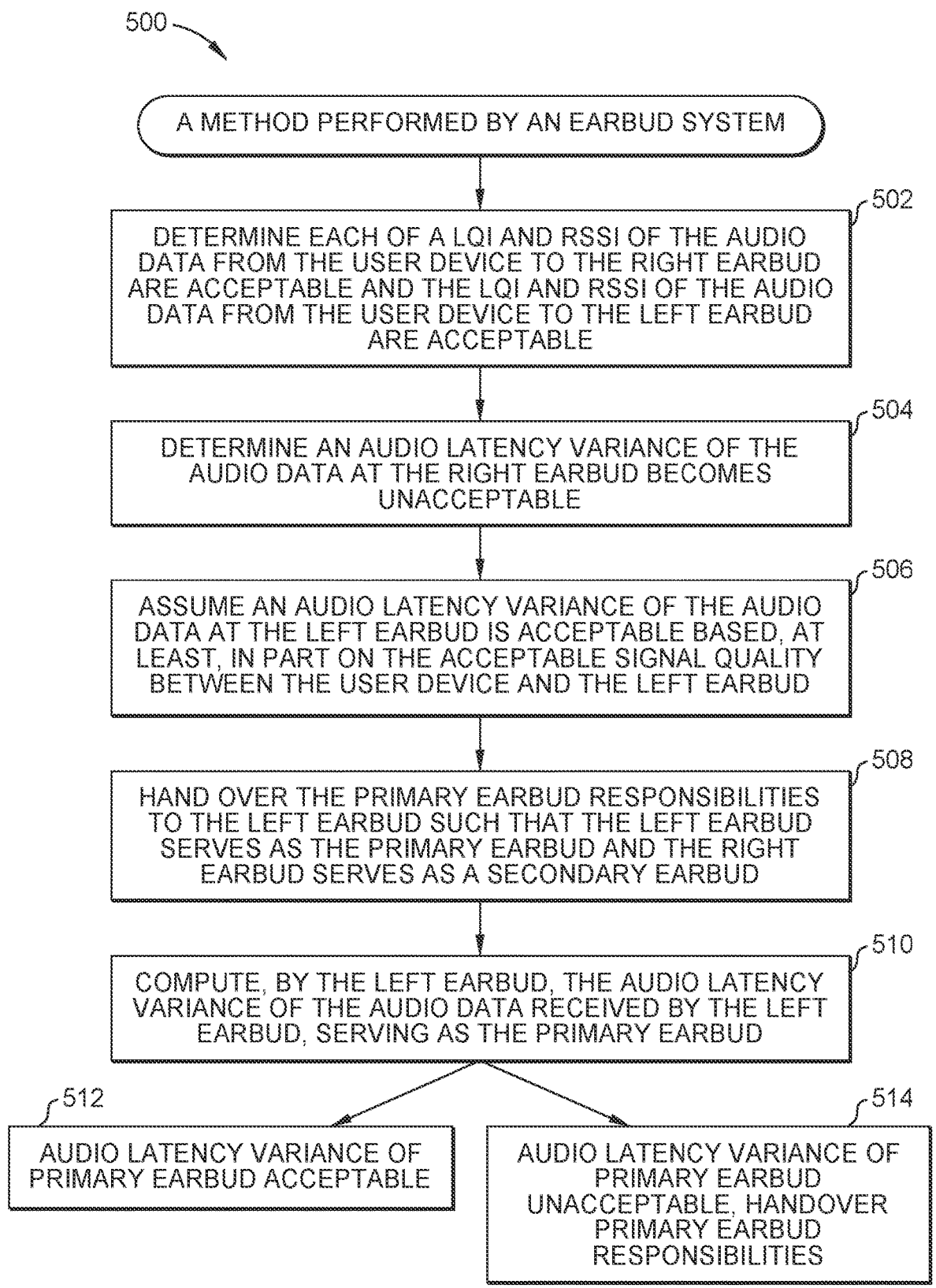
FIG. 5 illustrates an example try-and-see approach using LAT to determine when to handover primary earbud responsibilities to the secondary earbud.

FIG. 5 illustrates an example try-and-see approach 500 using LAT to determine when to handover primary earbud responsibilities to the secondary earbud. For illustrative purposes, the primary earbud in this example is initially Bud A and the secondary earbud is initially Bud B. The primary (Bud A) and the secondary (Bud B) earbud measure their LQI and RSSI. In aspects, the primary earbud (Bud A) receives the LQI and RSSI calculated by the secondary earbud (Bud B). Further, the primary earbud (Bud A) measures its LAT.

At 502, it is determined that both the primary earbud (Bud A) and the secondary earbud (Bud B) have a good or better LQI and RSSI ratings. At this point, a handover criterion has not been met.

At 504, the primary earbud (Bud A) begins experiencing audio buffer instability, resulting in an increased measured LAT. The LAT rating of the primary earbud (Bud A) is rated poor or otherwise unacceptable. In an aspect, the LAT is greater than a threshold value, meaning the primary earbud (Bud A) is not receiving audio data fast enough.

At 506, given the good or better LQI and RSSI rating at the secondary earbud (Bud B), the LAT of the secondary earbud (Bud B) is assumed to be acceptable.

A handover condition is met because both earbuds have an acceptable LQI and RSSI; however, the primary earbud (Bud A) has an LAT that is unacceptable. Therefore, at 508, the primary earbud (Bud A) will handover primary earbud responsibilities to the secondary earbud (Bud B).

At 510, the current primary earbud (Bud B) following handover is now in direct communication with the user device and will compute its LAT.

At 512, if the LAT of the current primary earbud (Bud B) is good or better, it is assumed the handover (from Bud A to Bud B) was appropriate and in the interest of avoiding audio drop-outs. Bud B may continue to service primary earbud responsibilities until a handover condition is met.

At 514, if the LAT of the current primary earbud (Bud B) is poor or worse, the primary earbud (Bud B) may hand back over primary earbud responsibilities to the current secondary earbud (Bud A) and the method 500 may begin again. In an effort to avoid near continuous repeated hand overs when both earbuds have a poor LAT, in aspects, after the handover at 514, the primary earbud (Bud A) may need to wait a configured minimum amount of time prior to handing over primary earbud responsibilities back to Bud B based on an unacceptable measured LAT at the primary earbud (Bud A).

In aspects, the handover at 514 is performed when one or more other handover criteria is met. Examples of triggers for handover include: selecting the battery level being low (for example when the earbud has 10% or less battery level)/the earbud powering down/the earbud is hibernating; the battery level on one earbud being higher than the other (all else being equal it is preferable to wear down the battery evenly between earbuds as the primary earbud uses battery more quickly); handedness preferences; the right earbud when no other conditions are met. In aspects, the handover is performed when the secondary earbud (Bud A) experiences a change in LQI or RSSI and is good or better. In aspects, a physical state change such as when an earbud is taken out of the ear will be prioritized over signal quality. Therefore, if the earbud having primary earbud responsibilities is taken out of the ear, the remaining earbud will become the primary earbud.

Figure 6:
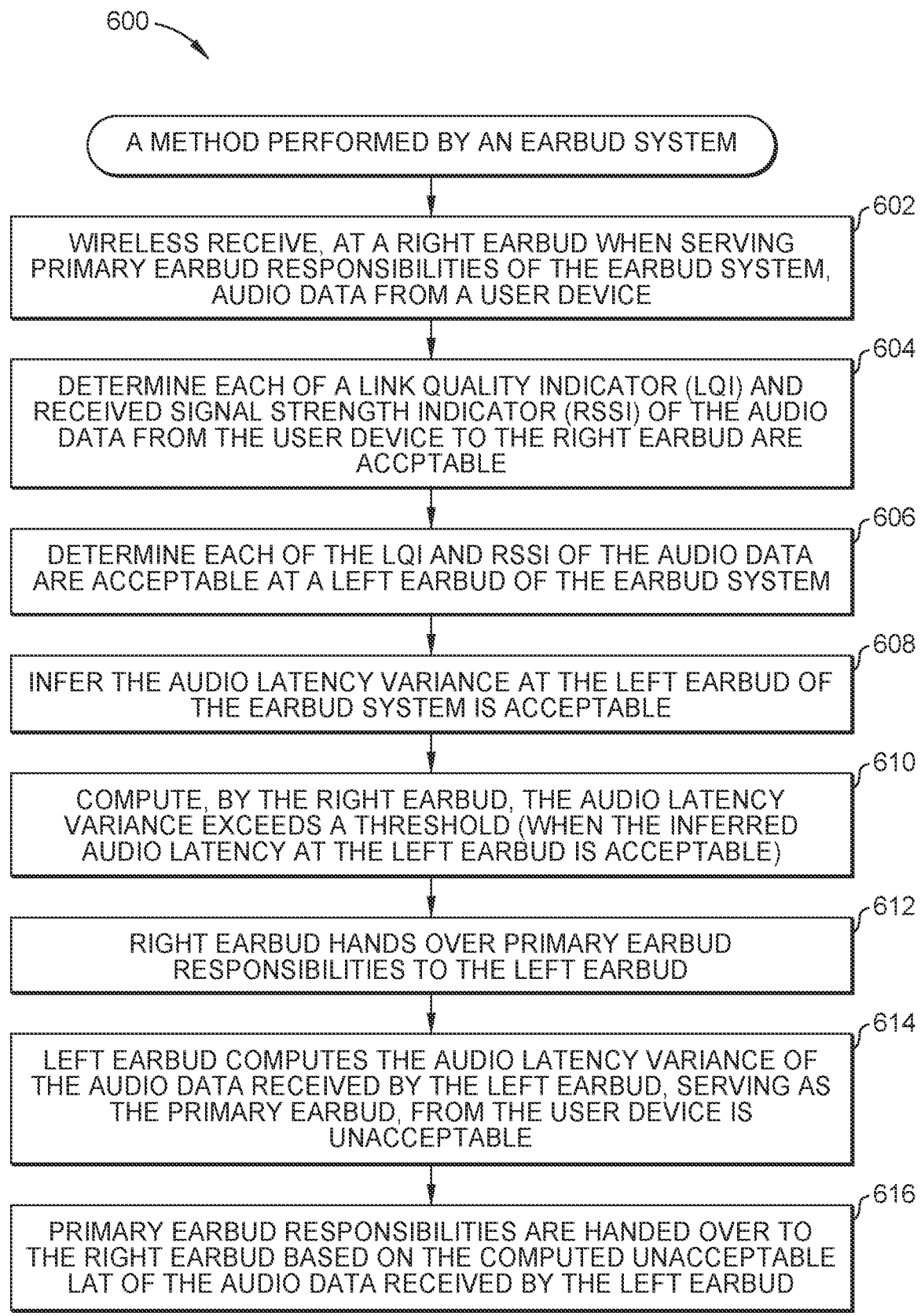
FIG. 6 illustrates an example handover procedure in accordance with aspects of the present disclosure.

FIG. 6 illustrates an example 600 handover procedure in accordance with aspects of the present disclosure. At 602, a right earbud (Bud A) when serving primary earbud responsibilities of an earbud system, receives audio data from a user device. At 604, the right earbud (Bud A) determines an acceptable signal quality between the user device and the right earbud (Bud A). Signal quality is determined based on measuring at least one of LQI or RSSI of the audio data between the user device and earbud.

At 606, the secondary earbud determines data has an acceptable signal quality between the user device and the left earbud (Bud B). In aspects, an acceptable LQI and an acceptable RSSI indicate an acceptable signal quality. Acceptable may mean any rating above "good".

At 608, the LAT of the audio data at the left earbud (Bud B) is assumed or inferred to be acceptable based, at least in part, on the acceptable signal quality between the user device and the left earbud. As described above, the left earbud (Bud B) cannot measure or compute the LAT because it is not serving as the primary earbud.

At 610, the right earbud (Bud A) computes the LAT of the audio data exceeds a threshold when the audio latency variance of the audio data at the left earbud is acceptable. By exceeding a threshold. The LAT is determined to be unacceptable. The LAT is computed based on the audio data received from the user device by the primary earbud.

At 612, the primary earbud hands over the primary earbud responsibilities to the left earbud (Bud B) based on the computation, such that the left earbud (Bud B) now serves as the primary earbud and the right earbud (Bud A) will serve as the secondary earbud.

At 614, the left earbud (Bud B) computes the audio latency variance of the audio data received by the left earbud, serving as the primary earbud, from the user device is unacceptable.

At 616, primary earbud responsibilities are handed over to the right earbud (Bud A) based on the computed unacceptable LAT of the audio data received by the left earbud (Bud B).

As described herein, it is important that a handover decision making algorithm responsible for driving handover changes accurately predict audio drop-outs before they occur. Accordingly, aspects describe methods and earbud systems that advantageously avoid unnecessary audio drop-outs by making handover decisions based, at least in part, on predictive factors. In aspects, the evaluated state of the system may be used to evaluate not only signal quality metrics but also audio latency variability.

Numerous uses of and departures from the specific apparatus and techniques disclosed herein may be made without departing from the inventive concepts. Consequently, the invention is to be construed as embracing each and every novel feature and novel combination of features disclosed herein.

The invention claimed is:

1. An earbud system comprising:
a right earbud and a left earbud,
wherein the right earbud, when serving primary earbud responsibilities of the earbud system, wirelessly receives audio data from a user device, requests specific audio data packets from the user device, and is in wireless communication with the left earbud acting as a secondary earbud of the earbud system;
wherein the secondary earbud receives audio data by eavesdropping on the primary earbud's connection with the user device;
wherein the right earbud performs a procedure to hand over the primary earbud responsibilities to the left earbud based, at least in part, on an audio latency variance of the audio data;
wherein the primary earbud calculates the audio latency variance, the audio latency variance being a numerical value; and
wherein the secondary earbud infers audio latency variance associated with the secondary earbud based, at least in part, on a signal quality between the secondary earbud and the user device.

2. The earbud system of claim 1, wherein an audio latency of the audio data received by the right earbud is a proxy for volatility of buffered audio at the right earbud.

3. The earbud system of claim 1, wherein the procedure comprises:
determining an acceptable signal quality between the user device and the right earbud;
determining an acceptable signal quality between the user device and the left earbud;
assuming an audio latency variance of the audio data at the left earbud is acceptable based, at least in part, on the acceptable signal quality between the user device and the left earbud;
computing, by the right earbud, the audio latency variance of the audio data received by the right earbud exceeds a threshold when the audio latency variance of the audio data at the left earbud is acceptable; and
handing over the primary earbud responsibilities to the left earbud based on the computation such that the left earbud serves as the primary earbud and the right earbud serves as the secondary earbud.

4. The earbud system of claim 3, wherein the procedure further comprises:
computing, by the left earbud, the audio latency variance of the audio data received by the left earbud, serving as the primary earbud, from the user device is unacceptable; and
handing over the primary earbud responsibilities to the right earbud based on the computed unacceptable audio latency variance of the audio data received by the left earbud.

5. The earbud system of claim 3, wherein the signal quality comprises at least one of a link quality indicator (LQI) or a received signal strength indicator (RSSI).

6. The earbud system of claim 1, wherein the earbud of the earbud system performing primary earbud responsibilities computes audio latency variance associated with the primary earbud based on the audio data received from the user device.

7. A method performed by an earbud system comprising:
wirelessly receiving, at a right earbud when serving primary earbud responsibilities of the earbud system, audio data from a user device;
performing, by the earbud system, a procedure to hand over the primary earbud responsibilities to a left earbud of the earbud system based on an audio latency variance of the audio data received by the right earbud, wherein the left earbud receives audio data by eavesdropping on the right earbud's connection with the user device, and wherein the right earbud calculates the audio latency variance, the audio latency variance being a numerical value; and
inferring, by the earbud of the earbud system acting as a secondary earbud, audio latency variance associated with the secondary earbud based, at least in part, on a signal quality between the secondary earbud and the user device.

8. The method of claim 7, wherein performing the procedure comprises:
determining an acceptable signal quality between the user device and the right earbud;
determining an acceptable signal quality between the user device and the left earbud;
assuming an audio latency variance of the audio data at the left earbud is acceptable based, at least, in part on the acceptable signal quality between the user device and the left earbud;
computing, by the right earbud, the audio latency variance of the audio data received by the right earbud exceeds a threshold when the audio latency variance of the audio data at the left earbud is acceptable; and
handing over the primary earbud responsibilities to the left earbud based on the computation such that the left earbud serves as the primary earbud and the right earbud serves as a secondary earbud.

9. The method of claim 8, wherein the procedure further comprises:
computing, by the left earbud, the audio latency variance of the audio data received by the left earbud, serving as the primary earbud, from the user device is unacceptable; and
handing over the primary earbud responsibilities to the right earbud based on the computed unacceptable audio latency variance of the audio data received by the left earbud.

10. The method of claim 8, wherein the signal quality comprises at least one of a link quality indicator (LQI) or a received signal strength indicator (RSSI).

11. The method of claim 8,
wherein determining the acceptable signal quality between the user device and the right earbud comprises determining the audio data has an acceptable link quality indicator and an acceptable received signal strength indicator; and
wherein determining the acceptable signal quality between the user device and the left earbud comprises determining the audio data has an acceptable link quality indicator and an acceptable received signal strength indicator.

12. The method of claim 7, further comprising:
computing, by the earbud of the earbud system performing primary earbud responsibilities, audio latency variance associated with the primary earbud based on the audio data received from the user device.

13. The method of claim 12, wherein performing the hand over is further based, at least in part, on a comparison between the computed audio latency variance and inferred audio latency variance.

14. The method of claim 7, further comprising:
determining an acceptable signal quality between the user device and the right earbud and an acceptable signal quality between the user device and the left earbud,
wherein performing the procedure is based the acceptable signal quality between the user device and the right earbud, the acceptable signal quality between the user device and the left earbud, and the audio latency variance of the audio data received by the right earbud.

15. A method performed by an earbud system comprising:
wirelessly receiving, at a right earbud when serving primary earbud responsibilities of the earbud system, audio data from a user device;
determining each of a link quality indicator (LQI) and received signal strength indicator (RSSI) of the audio data from the user device to the right earbud are acceptable;
determining each of the LQI and RSSI of the audio data are acceptable at a left earbud of the earbud system;
determining an audio latency variance of the audio data at the right earbud becomes unacceptable, wherein the left earbud receives audio data by eavesdropping on the right earbud's connection with the user device, and wherein the right earbud calculates the audio latency variance, the audio latency variance being a numerical value;
inferring, by the earbud of the earbud system acting as a secondary earbud, audio latency variance associated with the secondary earbud based, at least in part, on a signal quality between the secondary earbud and the user device; and
performing, by the earbud system, a procedure to hand over the primary earbud responsibilities to a left earbud of the earbud system based on the acceptable LQI and RSSI at the right earbud, the acceptable LQI and RSSI at the left earbud, and the audio latency variance of the audio data received by the right earbud becoming unacceptable.

16. The method of claim 15, further comprising:
after the procedure, determining an audio latency variance of the audio data at the left earbud, serving primary earbud responsibilities, becomes unacceptable;
determining a handover condition is satisfied; and
performing, by the earbud system, the procedure to hand over primary earbud responsibilities to the right earbud based on the audio latency variance of the audio data at the left earbud becoming unacceptable and the handover condition being satisfied.

17. The method of claim 16, wherein the handover condition comprises:
the right earbud being the preferred handedness earbud of the earbud system.

18. The method of claim 16, wherein the handover condition comprises:
determining at least one of the LQI or RSSI at the right earbud has improved.

19. The method of claim 15, wherein the audio latency of the audio data received by the right earbud is a proxy for volatility of buffered audio at the right earbud.

* * * * *